(12) United States Patent
Darie et al.

(10) Patent No.: US 9,167,091 B2
(45) Date of Patent: Oct. 20, 2015

(54) BIDIRECTIONAL REMOTE USER INTERFACE FOR HMI/SCADA USING INTERACTIVE VOICE PHONE CALLS

(71) Applicants: Florin Darie, Middletown, NJ (US); Dong Wei, Edison, NJ (US)

(72) Inventors: Florin Darie, Middletown, NJ (US); Dong Wei, Edison, NJ (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/033,609

(22) Filed: Sep. 23, 2013

(65) Prior Publication Data

US 2015/0085998 A1    Mar. 26, 2015

(51) Int. Cl.
*H04M 1/64* (2006.01)
*H04M 3/51* (2006.01)

(52) U.S. Cl.
CPC .................................. *H04M 3/5166* (2013.01)

(58) Field of Classification Search
CPC .................................................... H04M 3/5166
USPC .......... 379/40, 48, 67.1, 76, 85, 88.01–88.04, 379/88.18, 88.21–88.25, 167.08, 234, 263, 379/373.02, 37, 202.01; 704/235; 455/419
See application file for complete search history.

(56) References Cited

U.S. PATENT DOCUMENTS

| | | | |
|---|---|---|---|
| 7,664,233 B1 * | 2/2010 | Kirchmeier et al. | 379/37 |
| 7,844,035 B2 * | 11/2010 | Pietrowicz | 379/48 |
| 2008/0228480 A1 * | 9/2008 | Maegawa | 704/235 |

* cited by examiner

*Primary Examiner* — Md S Elahee
(74) *Attorney, Agent, or Firm* — Seyed Kaveh E. Rashidi-Yazd

(57) ABSTRACT

A two-way voice interface allows communication by telephone between a supervisory control and data acquisition (SCADA) system and a human operator. A phone-HMI gateway communicates with the SCADA system through an application programming interface (API), composes messages to the operator in text format and interprets text derived from voice commands from the operator. A cloud telephone service is used to convert from voice to text and from text to voice, and to set up the telephone connection with the human operator.

23 Claims, 4 Drawing Sheets

BIDIRECTIONAL REMOTE USER INTERFACE FOR HMI/SCADA USING INTERACTIVE VOICE PHONE CALLS

BACKGROUND OF THE INVENTION

1. Technical Field

The present invention relates to the control of automation processes using a supervisory control and data acquisition (SCADA), and, more specifically, to interfacing with a SCADA industrial control system though a bidirectional human-machine interface (HMI) based on interactive voice phone calls.

2. Discussion of the Related Art

Industrial control systems are computer controlled systems that monitor and control physical industrial processes. SCADA is typically an industrial control system capable of monitoring and controlling a large scale process that can involve multiple sites and large distances. For example, SCADA industrial control systems may monitor and control industrial processes, infrastructure, and facility-based processes. Those industrial processes may include manufacturing, production, power generation, fabrication, and refining, and may run in continuous, batch, repetitive, or discrete modes. Infrastructure processes may be public or private, and include water treatment and distribution, wastewater collection and treatment, oil and gas pipelines, electrical power transmission and distribution, wind farms, civil defense siren systems, and large communication systems. Facility processes include buildings, airports, ships, and space stations. They monitor and control heating, ventilation, and air conditioning systems (HVAC), access, and energy consumption.

An important part of most SCADA implementations is alarm handling. The system monitors whether certain alarm conditions are satisfied, to determine when an alarm event has occurred. Once an alarm event has been detected, one or more actions are taken, such as the activation of one or more alarm indicators, and possibly the generation of email or text messages so that management or remote SCADA operators are informed.

SUMMARY OF THE INVENTION

In an exemplary embodiment of the present invention, there is provided a method for providing a remote voice interface with a supervisory control and data acquisition system. A text command is received by a human-machine interface/telephone gateway from a cloud telephone service. The text command identifies an element of the supervisory control and data acquisition system and an action to be performed, the text command being derived from an audio voice command received by the cloud telephone service from a human operator. A system command based on the text command is transmitted via an application interface with the supervisory control and data acquisition system. A confirmation message is received from the supervisory control and data acquisition system in response to the system command. Text is then transmitted to the cloud telephone service for conversion to an audio message reporting the confirmation message to the human operator.

In another aspect of the invention, non-transitory computer useable media are provided having computer readable instructions stored thereon for execution by a processor to perform operations as described above.

DETAILED DESCRIPTION OF EXEMPLARY EMBODIMENTS

Figure 1:
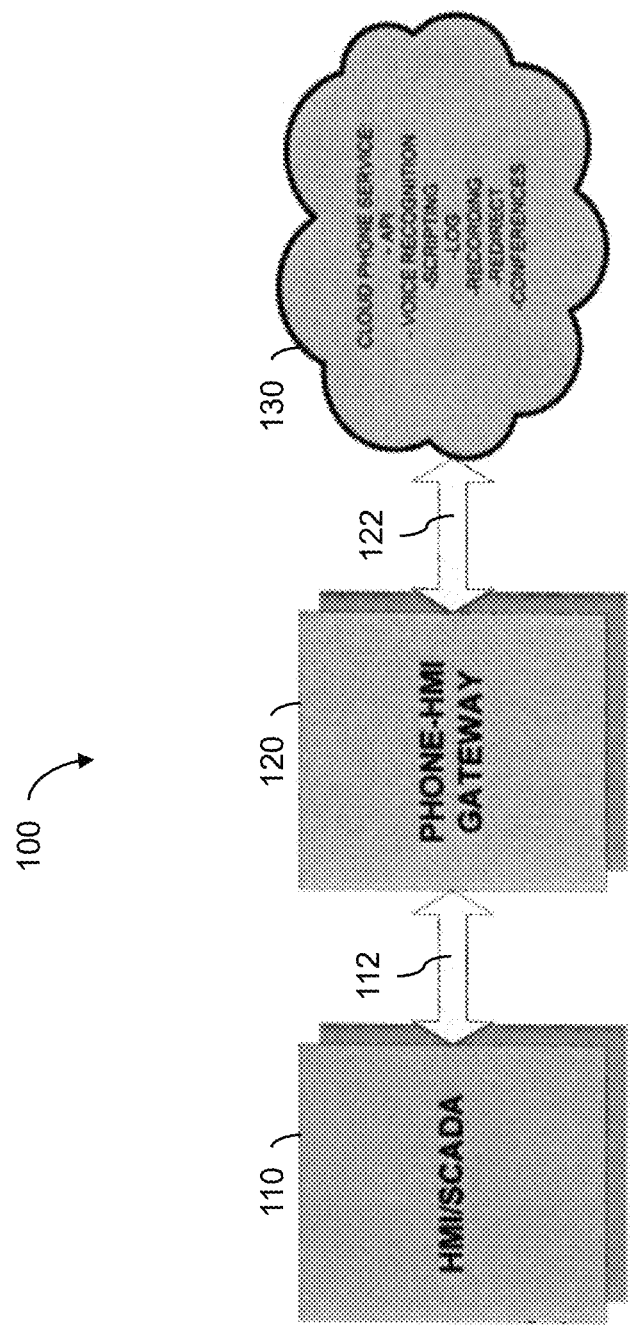
FIG. 1 is a block diagram representing the overall architecture of an exemplary embodiment of the present invention.

In HMI and SCADA systems, it is very important that operators are aware of the system status and that they are able to react quickly to critical or non-critical events. There are many ways to allow the operator to interact, monitor and control the automation process. In the present disclosure, a bidirectional remote communication is proposed between the operator and the automation system via interactive phone calls, thus allowing the end operator to react and control the automation system via voice phone calls. The disclosed method and apparatus are an extension of existing HMI/SCADA systems to allow bidirectional remote communication between the operator and the controlled process.

In most applications, an end user must be notified immediately in the event of an alarm in a SCADA system. One of the quickest ways to notify an operator about such events is through a voice phone call. One problem with existing telephony notification systems is that they are limited to only one direction of communication: the operator receives a voice notification describing the alarm event, but there is no mechanism to allow the operator to interact with the control system through the same phone call session via voice. In the presently described system, in addition to receiving a voice description of the alarm via the phone, the operator can react quickly, by issuing commands over the phone, depending on the current context. The context (alarm description, various system parameters, etc.) is interactively described to the operator within the same phone call session.

For non-critical cases (cases not currently in an alarm condition), the operator can remotely query and control the presently described SCADA system at any time via voice phone calls. For example, by calling an allocated phone number, the operator can interrogate the system status or the value of the different process elements via voice queries, and issue remote voice commands via the same phone call session.

Short message service (SMS) has been used in SCADA systems to notify the operator about critical events. That technique also results in one way data flow: the system sends an SMS message to the operator, who must then quickly react and get in front of an operator panel, or in front of remote computer that has access to the HMI/SCADA system. In many critical cases, that time delay is unacceptable. Interaction may be allowed with the operator via SMS messages which are sent from the operator's phone, but that communication is also slow, is difficult to use, and limited in function.

Other HMI/SCADA systems issue voice phone calls to the operator and describe the alarm event, but there is no way for the operator to quickly react and control the system via the same voice phone call. Instead, the operator must find an operator panel or a remote computer that has access to the HMI/SCADA system. Other systems offer embedded voice recognition as a direct operator input solution to replace a keyboard and mouse, but in order to benefit of that solution, the operator must physically present and use the dedicated microphone to issue commands.

In contrast, the presently described system allows the operator to interact with the control system via voice phone calls. The operator can remotely query the system status any time, take action based on the description and react to alarm events by voice. The proposed system minimizes the time between the occurrence of the event in the SCADA system and the operator's reaction to the event.

A block diagram representing an exemplary embodiment of the presently described system 100 for providing a remote user interface is presented in FIG. 1. The exemplary embodiment comprises three major elements: a SCADA industrial control system 110 with an HMI, a phone-HMI gateway 120 and a cloud phone service 130. The requirements and operation of each of the major components will be described in turn.

The HMI/SCADA industrial control system 110, as described above, is capable of generating alarm events and communicating those events via an application programming interface 112 to the phone-HMI gateway. The HMI/SCADA 110 also receives and responds to queries and commands from the phone-HMI gateway.

The phone-HMI gateway 120 manages communications between the HMI/SCADA system 110 and a cloud phone service 130 that interfaces via voice with a human operator.

The gateway 120 monitors for SCADA alarms events received from the HMI/SCADA system 110 via the application programming interface 112. The gateway takes actions in response to the alarm events by selecting and transmitting to the cloud phone service 130 text templates from a collection of text templates it hosts. A template is associated with each alarm event. Additionally, the gateway hosts text templates associated with various system elements, which are selected and transmitted to the cloud phone service in cases where a system element must be identified to a human operator.

A notification phone database is maintained by the gateway 120 in order to correlate each of the various alarms that may be received from the SCADA system with one or more operators to whom the alarm notifications will be directed, together with contact information such as telephone numbers. The database may also include other criteria that are considered in a rules-based algorithm before a call is connected to report an alarm, such as the time of day that an operator is available and the geographic location of the operator. In that way, an alarm notification is sent to an operator that is on call for the shift during which the alarm is generated, and is sent to a local operator who can respond in person, if necessary. Operator account information is also stored by the phone HMI gateway 120. That information includes user names, passwords and alternate telephone numbers. The operator account information may also include information that is considered before transmitting an alarm notification to an individual, such as a vacation schedule or a security clearance level.

The phone HMI gateway 120 has the ability to create and maintain a session with the cloud phone service. For that purpose, a URL or another network address of the cloud phone service, an account ID and password are stored by the gateway. The phone HMI gateway connects with the cloud phone service though a wide area network 122 such as the Internet.

Software executed by the phone HMI gateway 120 includes instructions for requesting that phone call connections be established from the cloud phone service 130 to human operators based on conditions, events, etc. For example, the phone HMI gateway may send a request to the cloud phone service to establish a two-way phone connection with a human operator in response to a SCADA alarm or as scheduled event from a scheduler.

The phone HMI gateway 120 has the capability of formatting and sending text to be voiced to the operator, in order to describe a current context in the HMI/SCADA system. Those capabilities also include formatting and sending questions to be voiced to the operator in cases where the SCADA system requires additional information. In either case, text is sent to the cloud phone service 130, where a text-to-voice functionality is used to convert the information to an audible message for the operator.

An interface to the cloud-based phone service 130 is exposed though the wide area network 122 by the phone HMI gateway 120 in order to receive the operator answers and commands in text format. The voice-to-text translation is part of the cloud-based phone service functionality.

The phone HMI gateway 120 additionally has the capability to interpret text received from the cloud-based phone service 130 and take actions in HMI/SCADA based on that interpretation. For example, the gateway may search for key words in the text spoken by the operator, and select a SCADA command based on the key words found. In another example, a limited vocabulary is presented to the human operator and a SCADA command is selected based on a one-to-one correlation between possible responses and a list of SCADA commands.

The cloud-based phone service 130 must guarantee several quality-related characteristics. Those guarantees may be made by the cloud-based phone service in the form of a service level agreement (SLA) between the cloud-based phone service and the provider of the bi-directional remote user SCADA interface described herein. First, the service must be secure. All data content exchanged between the phone-HMI gateway 120 and the cloud based phone service 130 must be guaranteed in terms of confidentiality, non-repudiation and availability. To that end, the interfaces between the phone-HMI gateway and the cloud based phone service via the wide area network 122 are encrypted using, for example, secure socket layer (SSL)/transport layer security (TSL). Additionally, the phone connection between the cloud based phone service and the human operator must be authenticated and secure.

Second, the cloud-based phone service must be reliable. The service must guarantee that requested phone calls are reliably connected. The voice recognition functionality must be of sufficient quality to match text with the operator answers. Call logs and voice recordings must be guaranteed. Callbacks to the phone HMI gateway 120 must be reliably connected.

Finally, quality of service of the cloud-based phone service 130 must meet minimum criteria. The system must issue phone calls on time. Voice recognition must perform in nearly real time with high accuracy. Computational resources must be dedicated to the described remote user interface service. The service must be scalable up or down depending on the number of human operators and the number of calls.

The interface with the cloud-based phone service 130 is via an API provided by the cloud service. The API must be capable of retrieving phone number contacts from a database maintained by phone HMI gateway 120. In that way, the disclosed remote user interface service controls the security and accuracy of that database. The API must also allow scripting to perform various task sequences initiated by the phone HMI gateway.

The API must further be capable of initiating phone calls and SMS messages to the human operator in response to requests from the phone HMI gateway. The API receives text versions of questions to be relayed to the human operator, and presents the questions as voice within phone calls or SMS messages. The API also transmits to the phone HMI gateway, in text form, answers received from the human operator as voice during the phone call. The API is capable of retrieving logs and recordings of the communications with human operators and transmitting them to the phone HMI gateway.

In an exemplary embodiment used in prototype development by the inventors, the Tropo™ cloud API for voice is used to provide the cloud-based phone service 130.

The phone-HMI gateway 120 and the cloud phone service 130 may, in an alternative embodiment, be combined as in a single device that comprises a "system-on-a-chip" microprocessor unit such as an MCF5301x Coldfire MPU available from Freescale Semiconductor, Inc. Such a micro processing unit contains, in addition to a CPU, a voice CODEC and amplifiers and text-to-speech and speech-to-text capabilities.

Figure 2:
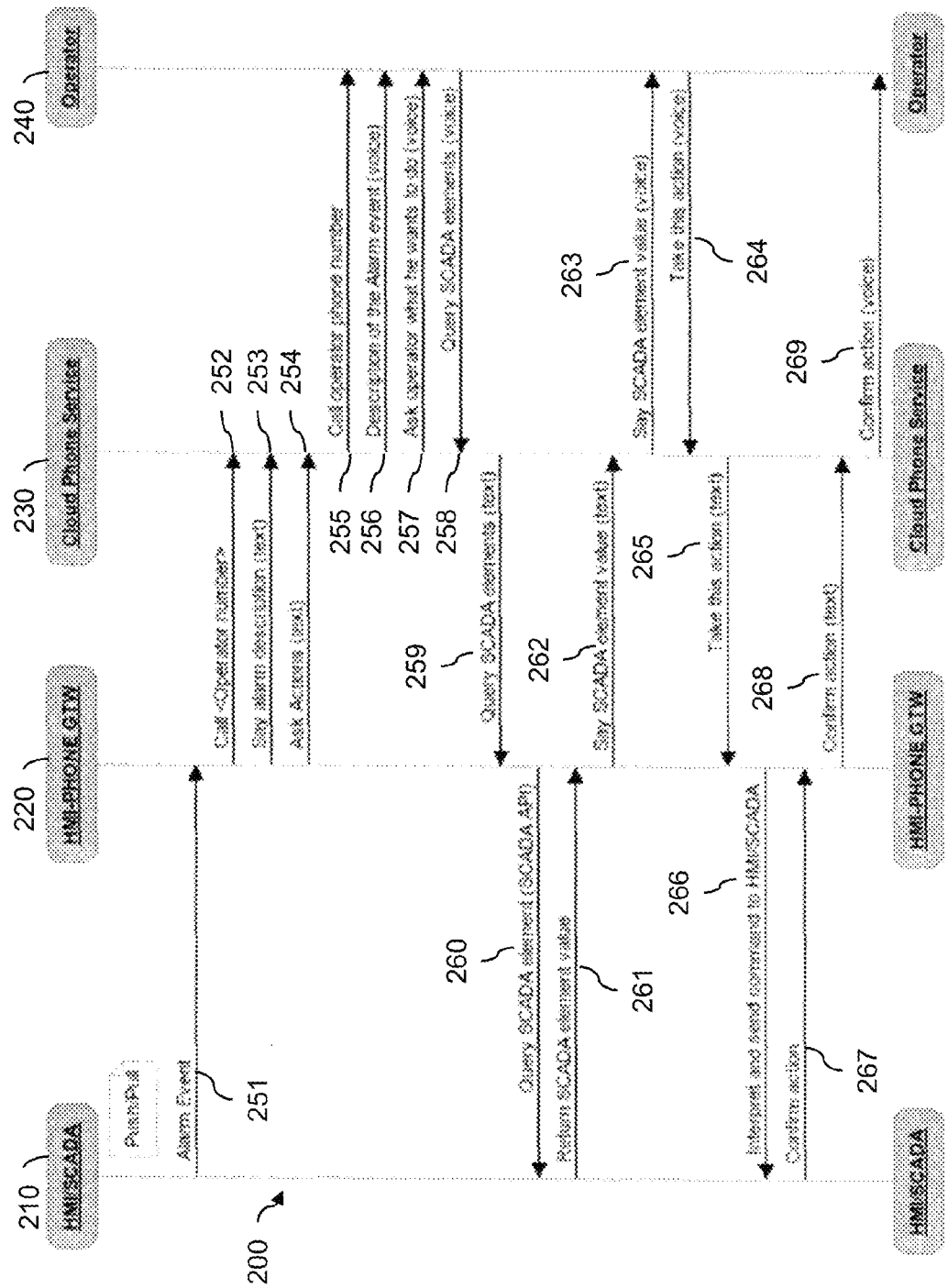
FIG. 2 is a sequence diagram illustrating operations in one embodiment of the invention.

The sequence diagram of FIG. 2 represents an example scenario in which a SCADA alarm has occurred and is propagated over the components (HMI/SCADA 210, HMI/telephone gateway 220, cloud telephone service 230) to the human operator 240. In the particular scenario shown, before the operator takes any action, the operator queries the system for a particular SCADA element and, based on the feedback that the operator receives, takes actions via voice input, which is translated and propagated to the SCADA system. For simplicity, the authentication steps are not shown in the sequence. The human operator is preferably authenticated before being allowed to take any action via the HMI/SCADA.

The example sequence 200 shown in FIG. 2 begins with an alarm being generated by the SCADA system causing an alarm event 251 to be transmitted from the HMI/SCADA 210 to the HMI/telephone gateway 220. A rules engine executing on the HMI/telephone gateway 220 determines which human operator or operators should be called based, for example, on the operators' expertise, working hours, geographical proximity to the SCADA element generating the alarm, vacation schedules, security clearances, etc. A message 252 is sent to the cloud phone service 230 requesting that a call be placed to a telephone number retrieved from a database maintained by the gateway 220. The same message or an additional message contains text 253 describing the alarm and text 254 listing available actions that the human operator may choose after receiving the call relating the alarm.

In response to receiving the messages 252, 253, 254, the cloud phone service 230 places a telephone call 255 to the human operator 240, using the telephone number received from the gateway 220. An audio voice message played to the operator includes a description 256 of the alarm event based on the alarm description received from the gateway 220, as well as an audio prompt 257 requesting that the operator indicate what action he or she would like to take. The audio prompt may include a list of available actions based on the text 254 listing available actions received from the gateway 220. The audio content transmitted to the human operator may comprise prerecorded content selected by the cloud phone service based on the text received from the gateway, or may be generated from the text using a text-to-voice functionality of the cloud phone service.

In the example presented in FIG. 2, the human operator 240 decides to request 258 the status of one or more SCADA elements before taking any action. That sequence of events is merely an example to illustrate the available operations of a working system, and it can be seen that other options, such as taking action immediately upon an alarm notification, are available to the operator.

The cloud phone service 230 receives the human operator's voice request 258 for the status of one or more SCADA elements, and, using voice-to-text functionality, converts the request to a text message. In the example of FIG. 2, the voice request 258 from the operator contains an identification of a SCADA element and a request for its status. After converting that message to text, the cloud phone service transmits the text 259 to the HMI/telephone gateway 220. The gateway 220 creates a query 260 in the format required by the SCADA API, requesting the status of the SCADA element identified in the text 259, and transmits that query 260 to the HMI/SCADA 210.

The HMI/SCADA 210 returns the requested status 261 to the HMI/telephone gateway 220. The status may, for example, be a sensor value, a switch or valve status, or an overall system status. The status 261 is transmitted in a format used by the HMI/SCADA 210.

The HMI/telephone gateway 220 formulates a text description 262 of the SCADA element status based on the received status 261 from the HMI/SCADA 210. The formulated text description 262 is transmitted to the cloud telephone service 230, where it is converted to a voice message 263 that is transmitted to the human operator 240.

In the present example, it is assumed that the human operator, after receiving the voice message 263, decides to take a certain action. The action may be another action selected from the list of available actions based on the text 254, may be selected from a new list of available actions transmitted with the voice status message 263, or may be a new action that must be interpreted by the HMI/telephone gateway 220. In any case, the human operator transmits to the cloud telephone service 230 a voice command 264 requesting an action, and the cloud telephone service transcribes the voice command to a text command 265 and transmits the text command to the HMI/telephone gateway 220. The text command 265 is interpreted by the HMI/telephone gateway 220 and the resulting SCADA command 266 is transmitted to the HMI/SCADA system 210.

Once the requested action has been taken by the SCADA system, a confirmation message 267 is sent to the HMI/telephone gateway 220, which composes a text message 268 that is transmitted to the cloud telephone service 230. The cloud phone service converts the text 268 into a voice message 269 that is transmitted to the human operator 240 to confirm that the requested action has been taken.

Figure 3:
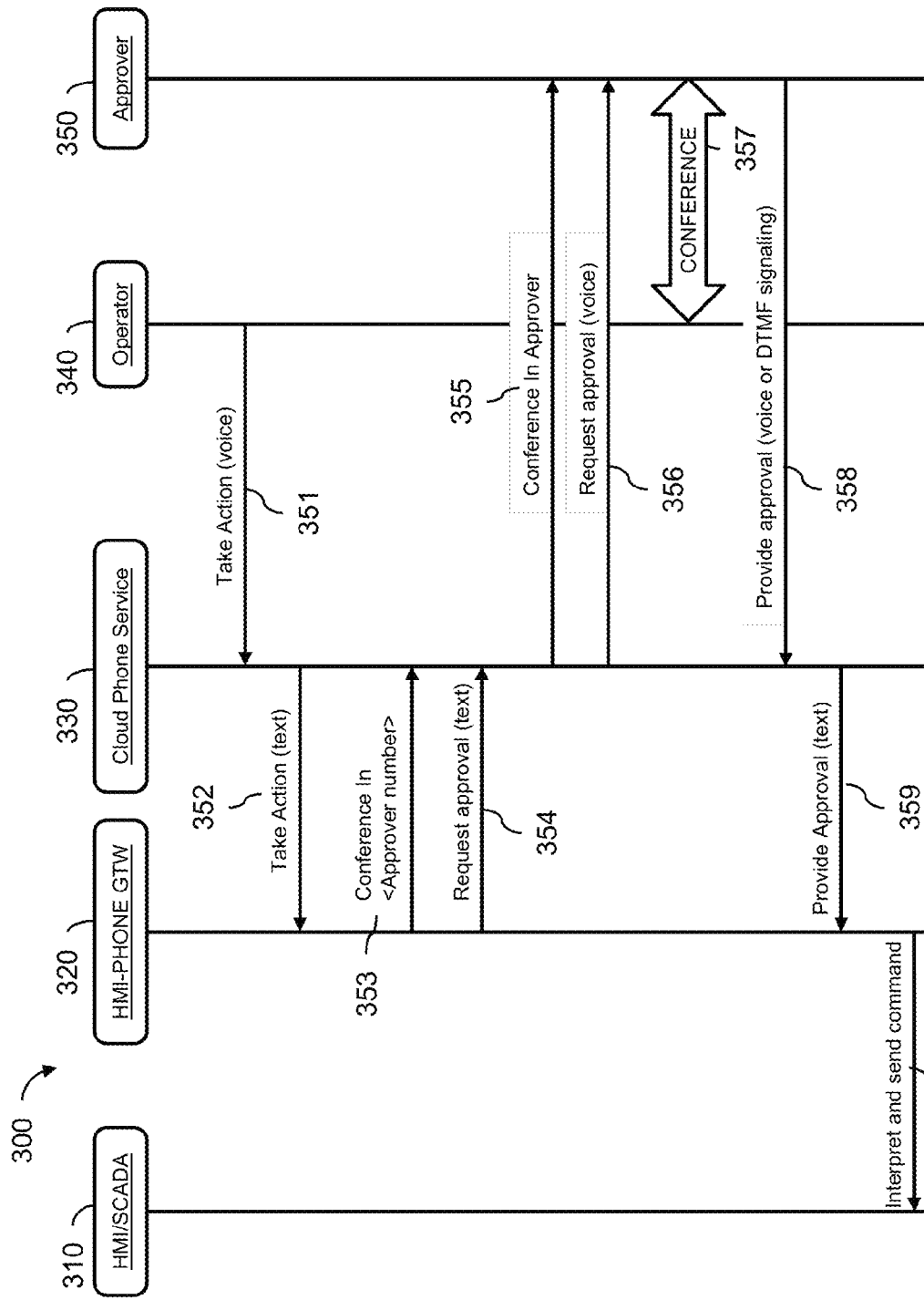
FIG. 3 is a sequence diagram illustrating operations in another embodiment of the invention.

An example sequence of events 300 is illustrated in FIG. 3 in which a telephone conferencing functionality of the cloud telephone service 330 is utilized in a situation where an action requested by the operator 340 must be authorized by another party, called an "approver" 350. The operator 340 makes a voice request 351 that an action be taken, which voice request is converted to text 352 by the cloud phone service 330 and transmitted to the HMI-phone gateway 320. The HMI-phone gateway identifies a SCADA action from the text message 352, and makes a determination whether additional authorization is needed before a command can be sent to the HMI/SCADA system 310. That determination may be made, for example, using a look-up table of SCADA actions and corresponding authorization levels. The table may reside in the HMI-phone gateway 320 or may be accessed externally. The table may be under control of the HMI/SCADA system, in which case additional messaging between the HMI-phone gateway and the HMI/SCADA system would be required to determine the required authorization of a particular action.

If additional authorization is needed, the HMI-phone gateway 320 transmits to the cloud phone service 330 a request 353 to conference in an approver using a telephone number also contained in the look-up table. The HMI-phone gateway also transmits text 354 representing a request for approval, including the proposed action to be taken. In response, the cloud phone service sets up at operation 355 a conference call connection including the existing connection with the operator 340 and a new connection with the approver 350, using the provided telephone number. The cloud phone service also provides, via voice to both participants in the conference call, a voice request 356 for the approval. Because a conference call 357 exists between the operator 340 and the approver 350, the approver is able to directly ask questions and otherwise verbally interact with the operator during the approval process.

Figure 4:
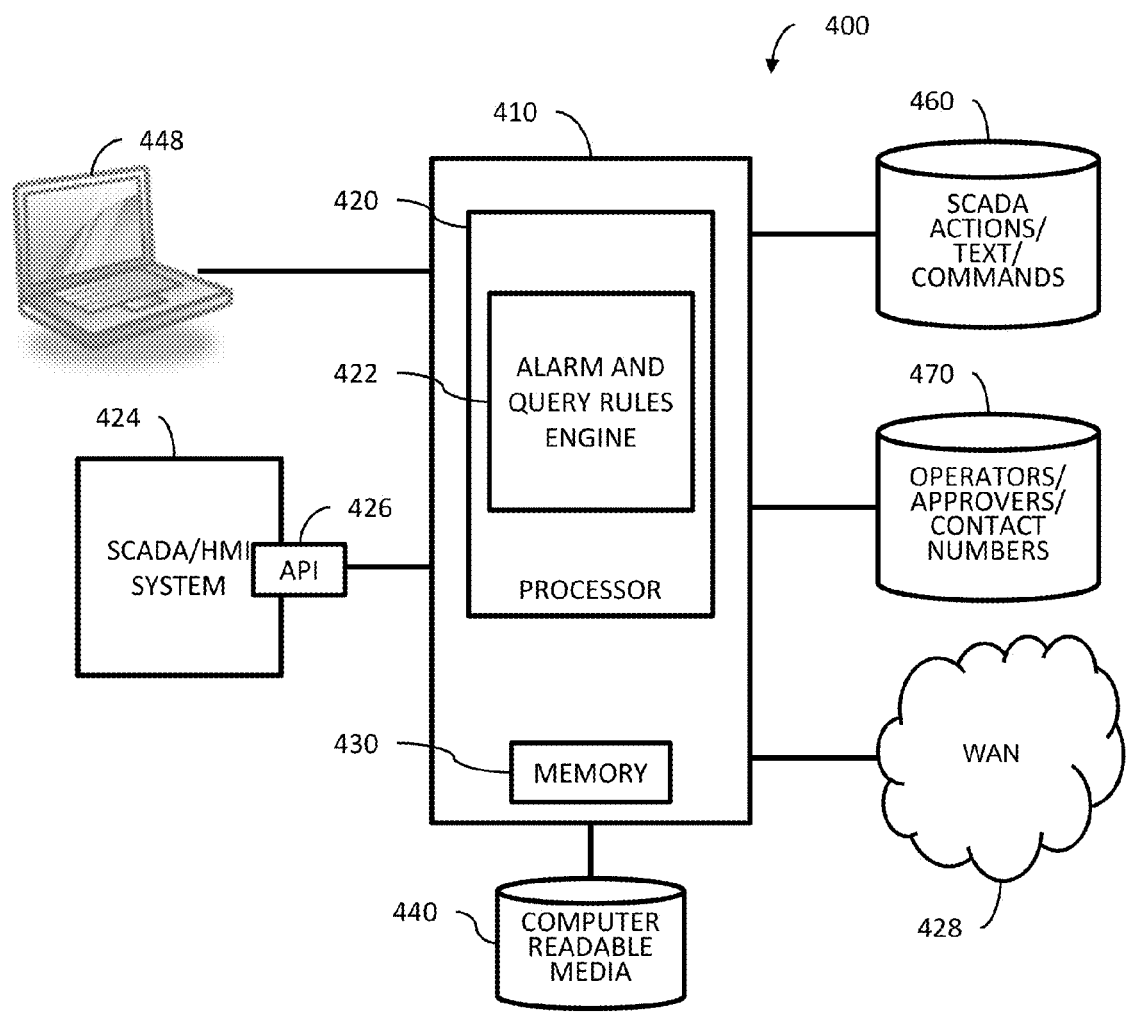
FIG. 4 is a schematic diagram of an exemplary system used in performing the method of the invention.

If the approver chooses to approve the action, he or she may do so via a verbal indication 358 or through DTMF (dual-tone multi-frequency) signaling using the telephone touchtone keypad. The cloud phone service 330 converts the approval to text 359 and transmits it to the HMI-phone gateway 320. After verifying that the action is approved, the gateway then transmits to the HMI/SCADA system 310 the command 360 corresponding to the requested action System Some of the elements of the methodology as described above may be implemented in an HMI/telephone gateway comprising a computer system such as the exemplary system 400 is shown in FIG. 4.

A computing apparatus 410 of the system 400 may be a mainframe computer, a desktop or laptop computer or any other device or group of devices capable of processing data. The computing apparatus 410 receives data from any number of data sources that may be connected to the apparatus. For example, the computing apparatus 410 may receive input from a user via an input/output device 448, such as a computer or a computing terminal. The input/output device includes an input that may be a mouse, network interface, touch screen, etc., and an output that may be a visual display screen, a printer, etc. Input/output data may be passed between the computing apparatus 410 and the input/output device 448 via a wide area network such as the Internet, via a local area network or via a direct bus connection. The computing apparatus 410 may be configured to operate and display information by using, e.g., the input/output device 448 to execute certain tasks. In one embodiment, the rules engine and databases used by the disclosed system are maintained and updated using the input/output device 448.

The computing apparatus 410 includes one or more processors 420 such as a central processing unit (CPU) and further includes a memory 430. The processor 420, when configured using software according to the present disclosure, includes an alarm and query rules engine 422 for performing the alarm functions and query functions discussed herein. Additional modules to perform additional operations as described above may be incorporated in the processor 420.

The computing system 410 is connected to the SCADA/HMI system 424 via an API 426 provided by the SCADA/HMI system. The computing system is also connected to the cloud telephone service via a WAN 428 such as the Internet. The cloud telephone service may alternatively be integrated with the HMI/telephone gateway, in which telephone calls are placed directly over the WAN 428. In that case, the cloud telephone service may be implemented as an additional software module running in the processor 420, or as a separate processor designed for that purpose.

The memory 430 may include a random access memory (RAM) and an erasable programmable read-only memory (EPROM). The memory may also include removable media such as a disk drive, tape drive, memory card, etc., or a combination thereof. The RAM functions as a data memory that stores data used during execution of programs in the processor 420; the RAM is also used as a program work area. The EPROM functions as a program memory for storing a program executed in the processor 420. The program may reside on the EPROM or on any other tangible, non-volatile computer-readable media 440 as computer readable instructions stored thereon for execution by the processor to perform the methods of the invention. The EPROM may also contain data for use by the program or by other programs.

Generally, the rules engine 422 described above include routines, objects, components, data structures and the like that perform particular tasks or implement particular abstract data types. The term "program" as used herein may connote a single program module or multiple program modules acting in concert. The disclosure may be implemented on a variety of types of computers, including personal computers (PCs), hand-held devices, multi-processor systems, microprocessor-based programmable consumer electronics, network PCs, mini-computers, mainframe computers and the like. The disclosed technique may also be employed in distributed computing environments, where tasks are performed by remote processing devices that are linked through a communications network. In a distributed computing environment, modules may be located in both local and remote memory storage devices.

An exemplary processing module for implementing the methodology above may be hardwired or stored in a separate memory that is read into a main memory of a processor or a plurality of processors from a computer readable medium such as an EPROM, hard magnetic drive, optical storage, tape or flash memory. In the case of a program stored in a memory media, execution of sequences of instructions in the module causes the processor to perform the operations described herein. The embodiments of the present disclosure are not limited to any specific combination of hardware and software and the computer program code required to implement the foregoing can be developed by a person of ordinary skill in the art.

The term "computer-readable medium" as employed herein refers to a tangible, non-transitory machine-encoded medium that provides or participates in providing instructions to one or more processors. For example, a computer-readable medium may be one or more optical or magnetic memory disks, flash drives and cards, a read-only memory or a random access memory such as a DRAM, which typically constitutes the main memory. The terms "tangible media" and "non-transitory media" each exclude propagated signals, which are not tangible and are not non-transitory. Cached information is considered to be stored on a computer-readable medium. Common expedients of computer-readable media are well-known in the art and need not be described in detail here.

CONCLUSION

The forgoing detailed description is to be understood as being in every respect illustrative and exemplary, but not restrictive, and the scope of the disclosure herein is not to be determined from the description, but rather from the claims as interpreted according to the full breadth permitted by the patent laws. It is to be understood that various modifications will be implemented by those skilled in the art, without departing from the scope and spirit of the disclosure.

What is claimed is:

1. A method for providing a remote voice interface with a supervisory control and data acquisition system, the method comprising:

by a human-machine interface telephone gateway, receiving from a cloud telephone service a text command identifying an element of the supervisory control and data acquisition system and an action to be performed, the text command being derived from an audio voice command received by the cloud telephone service from a human operator;

transmitting, via an application interface with the supervisory control and data acquisition system, a system command based on the text command, after receiving a text approval in response to an approval request via a conference call;

receiving, from the supervisory control and data acquisition system, a confirmation message in response to the system command; and transmitting, to the cloud telephone service, text for conversion to an audio message reporting the confirmation message to the human operator.

2. A method as in claim 1, further comprising:

at the cloud telephone service, receiving the audio voice command from the human operator via a telephone connection;

converting the audio voice command to the system command; and transmitting the system command to the human-machine interface telephone gateway.

3. A method as in claim 2, further comprising:

at the cloud telephone service, receiving from the human-machine interface telephone gateway the text for conversion to an audio message;

converting the text for conversion to an audio message to the audio message reporting the value to the human operator; and transmitting the audio message to the human operator.

4. A method as in claim 2, wherein converting the audio voice command to the system command comprises selecting a predetermined command from a plurality of commands based on an audio-to-text conversion of the audio voice command.

5. A method as in claim 1, further comprising:

by the human-machine interface telephone gateway, receiving from the cloud telephone service a text authentication message for authenticating the human operator.

6. A method as in claim 5, wherein the text authentication message is derived by the cloud telephone service from an audio voice authentication request received from the human operator.

7. A method as in claim 1, wherein the audio voice command is an audio status request, the system command is a system status request, the confirmation message contains a system status and the audio message reports the system status.

8. A method as in claim 1, wherein the audio voice command is an audio command to take action, the system command is an action request, the confirmation message contains a confirmation that the supervisory control and data acquisition system took the requested action and the audio message reports the confirmation.

9. The method as claimed in claim 1, wherein the supervisory control and data acquisition system is a system for monitoring and controlling an industrial process, and further wherein the system command is a command to remotely query a status of the industrial process.

10. The method as claimed in claim 1, wherein the supervisory control and data acquisition system is a system for monitoring and controlling an infrastructure, and further wherein the system command is a command to remotely query a status of the infrastructure.

11. The method as claimed in claim 1, wherein the supervisory control and data acquisition system is a system for monitoring and controlling a facility-based process, and further wherein the system command is a command to remotely query a status of the facility-based process.

12. A non-transitory computer-usable medium having computer readable instructions stored thereon that, when executed by a processor, cause the processor to perform operations for providing a remote voice interface with a supervisory control and data acquisition system, the operations comprising:

by a human-machine interface telephone gateway, receiving from a cloud telephone service a text command identifying an element of the supervisory control and data acquisition system and an action to be performed, the text command being derived from an audio voice command received by the cloud telephone service from a human operator;

transmitting, via an application interface with the supervisory control and data acquisition system, a system command based on the text command, after receiving a text approval in response to an approval request via a conference call;

receiving, from the supervisory control and data acquisition system, a confirmation message in response to the system command; and transmitting, to the cloud telephone service, text for conversion to an audio message reporting the confirmation message to the human operator.

13. A non-transitory computer-usable medium as in claim 12, wherein the operations further comprise:

at the cloud telephone service, receiving the audio voice command from the human operator via a telephone connection;

converting the audio voice command to the system command; and transmitting the system command to the human-machine interface telephone gateway.

14. A non-transitory computer-usable medium as in claim 13, wherein the operations further comprise:

at the cloud telephone service, receiving from the human-machine interface telephone gateway the text for conversion to an audio message;

converting the text for conversion to an audio message to the audio message reporting the value to the human operator; and transmitting the audio message to the human operator.

15. A non-transitory computer-usable medium as in claim 13, wherein converting the audio voice command to the system command comprises selecting a predetermined command from a plurality of commands based on an audio-to-text conversion of the audio voice command.

16. A non-transitory computer-usable medium as in claim 12, wherein the operations further comprise:

by the human-machine interface telephone gateway, receiving from the cloud telephone service a text authentication message for authenticating the human operator.

17. A non-transitory computer-usable medium as in claim 16, wherein the text authentication message is derived by the cloud telephone service from an audio voice authentication request received from the human operator.

18. A non-transitory computer-usable medium as in claim 12, wherein the audio voice command is an audio status request, the system command is a system status request, the confirmation message contains a system status and the audio message reports the system status.

19. A non-transitory computer-usable medium as in claim 12, wherein the audio voice command is an audio command to take action, the system command is an action request, the confirmation message contains a confirmation that the supervisory control and data acquisition system took the requested action and the audio message reports the confirmation.

20. A human-machine interface telephone gateway for providing a remote voice interface with a supervisory control and data acquisition system, comprising:

a processor;

an application programming interface with the supervisory control and data acquisition system;

a data connection with a cloud telephone service;

a non-transitory computer-usable medium having computer readable instructions stored thereon that, when executed by the processor, cause the processor to perform operations for voice communication with the supervisory control and data acquisition system, the operations comprising:

receiving via the interface with the cloud telephone service a text command identifying an element of the supervisory control and data acquisition system and an action to be performed, the text command being derived from an audio voice command received by the cloud telephone service from a human operator;

transmitting, via the application interface with the supervisory control and data acquisition system, a system command based on the text command, after receiving a text approval in response to an approval request via a conference call;

receiving, via the application interface with the supervisory control and data acquisition system, a confirmation message in response to the system command; and transmitting, via the interface with the cloud telephone service, text for conversion to an audio message reporting the confirmation message to the human operator.

21. A human-machine interface telephone gateway as in claim 20, wherein the operations further comprise:

at the cloud telephone service, receiving the audio voice command from the human operator via a telephone connection;

converting the audio voice command to the system command; and transmitting the system command to the human-machine interface telephone gateway.

22. A human-machine interface telephone gateway as in claim 20, wherein the audio voice command is an audio status request, the system command is a system status request, the confirmation message contains a system status and the audio message reports the system status.

23. A human-machine interface telephone gateway as in claim 20, wherein the audio voice command is an audio command to take action, the system command is an action request, the confirmation message contains a confirmation that the supervisory control and data acquisition system took the requested action and the audio message reports the confirmation.

* * * * *